United States Patent [19]

Shioji et al.

[11] Patent Number: 5,403,821
[45] Date of Patent: Apr. 4, 1995

[54] DRILLING FLUID ADDITIVES

[75] Inventors: Shorbu Shioji; Yoshio Irie, both of Hyogo; Teruaki Fujiwara, Kyoto, all of Japan

[73] Assignee: Nippon Shokubai Kagaku Kogyo Co., Ltd., Osaka, Japan

[21] Appl. No.: 140,884

[22] Filed: Oct. 25, 1993

Related U.S. Application Data

[63] Continuation of Ser. No. 817,986, Jan. 8, 1992, abandoned, which is a continuation of Ser. No. 432,822, Nov. 7, 1989, abandoned.

[30] Foreign Application Priority Data

Nov. 9, 1988 [JP] Japan .................. 63-281262

[51] Int. Cl.$^6$ ............................................. C09K 7/02
[52] U.S. Cl. ................................ 507/119; 507/118; 507/122; 526/278; 526/287; 526/318.42
[58] Field of Search ............... 507/118, 119, 122; 526/278, 287, 318.42

[56] References Cited

U.S. PATENT DOCUMENTS

| | | | |
|---|---|---|---|
| 2,601,256 | 6/1952 | Bruson | 526/311 X |
| 4,338,239 | 7/1982 | Dammann | 526/318.42 X |
| 4,476,930 | 10/1984 | Watanabe | 166/279 |
| 4,500,693 | 2/1985 | Takehara et al. | |
| 4,518,510 | 5/1985 | Gleason et al. | |
| 4,732,698 | 3/1988 | Chen | 526/287 X |
| 4,738,788 | 4/1988 | Aurenge | |
| 4,749,498 | 6/1988 | Lange et al. | |
| 5,032,295 | 7/1991 | Matz et al. | |

FOREIGN PATENT DOCUMENTS

| | | |
|---|---|---|
| 0202995 | 11/1986 | France . |
| 0144140 | 6/1985 | United Kingdom . |
| 0215565 | 3/1987 | United Kingdom . |

OTHER PUBLICATIONS

Grim, R. E. "Clays (Uses)" Kirk–Othmer Encyclopedia of Chemical Technology, 3rd Ed. 1979, N.Y. Wiley & Sons, pp. 207–223, Ref TP9 E68 1978.

*Primary Examiner*—Gary Geist
*Attorney, Agent, or Firm*—Armstrong, Westerman, Hattori, McLeland & Naughton

[57] ABSTRACT

This invention provides a drilling fluid containing additives composed of copolymers which are obtainable by an industrially favorable process and superior in heat-resisting property. Even though the additives are used in a relatively small amount, such an amount sufficiently prevents changes in the properties of drilling fluid due to various kinds of hard water components being contained in underground water or cement as well as due to sea water, and the additives are able to display the properties of drilling fluid constantly regardless of presence or absence of salts.

Drilling fluid additives of the present invention are composed of a water-soluble copolymer (A) having an average molecular weight of 1,000–50,000. The water soluble copolymer (A) is composed of 40–99.5 mole percent of an unsaturated carboxylic acid monomer (I), as shown in the following general formula (I), and 0.5–60 mole percent of an unsaturated (meth)allylether monomer (II), as shown in the general formula (II).

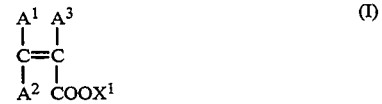

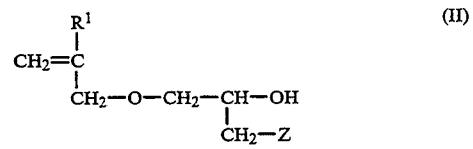

In the formula (I), each of $A^1$ and $A^2$ independently represents hydrogen, methyl, or $-COOX^2$ and $A^1$ and $A^2$ are not $COOX^2$ at the same time. $A^3$ represents hydrogen, methyl, or $-CH_2COOX^3$ and, in a case that $A^3$ is $-CH_2COOX^3$, each of $A^1$ and $A^2$ independently represents hydrogen or methyl. Each of $X^1$, $X^2$, and $X^3$ independently or at the same time represents hydrogen, monovalent metal, divalent metal, ammonium, or organic amine.

(Abstract continued on next page.)

ABSTRACT

In the formula (II), $R^1$ represents hydrogen or methyl, and Z represents hydroxyl; a sulfonic acid group or its monovalent metal salt, divalent metal salt, ammonium salt, and organic amine salt; a phosphoric (or phosphorous) acid group or its monovalent metal salt, divalent metal salt, ammonium salt, and organic amine salt.

5 Claims, No Drawings

DRILLING FLUID ADDITIVES

This application is a continuation of application Ser. No. 07/817,986, filed Jan. 8, 1992, now abandoned, which is a continuation of application Ser. No. 07/432822, filed Nov. 7, 1989, and now abandoned.

BACKGROUND OF THE INVENTION

The present invention relates to a drilling fluid containing additives used for stabilizing muddy water. The drilling fluid is used in cases where the ground is deeply excavated, such as a foundation work in engineering works, boring of a petroleum well or a geothermal well, and so on.

Hitherto, in cases where the ground is excavated, drilling fluid prepared on the ground surface is continuously and cyclically injected into the excavating parts to absorb frictional high heat generated during excavation, to move excavation trash from the pit bottom toward the ground surface, to maintain the drill pit wall, or to prevent collapse of a layer which is undergoing degradation.

The drilling fluid is usually prepared in a muddy state using inorganic clayey substances such as bentonite, attapulgite, and sericite, with water, and also with drilling fluid additives to stabilize the drilling fluid.

Among inorganic compounds used as drilling fluid additives, condensed phosphates such as sodium tripolyphosphate and sodium hexametaphosphate; alkali-metal carbonates such as sodium carbonate and potassium carbonate; aluminates such as sodium aluminate and potassium aluminate are known. Among organic compounds used as drilling fluid additives, humic acid salts, lignosulfonic acid salts, carboxymethylcellulose (CMC), hydroxyethylcellulose (HEC), polyvinylalcohol (PVA), and phosphonic acids are known. However, a lot of problems have been reported with the use of such additives.

Although, relatively speaking, the condensed phosphates have been highly evaluated, if their use is continued for a long period, they spread over the ground and flow into seas or lakes. They may, therefore, cause the generation of water-bloom or red tide. As such, their use in recent years has been strictly limited. Although CMC has gotten a relatively favorable evaluation, drilling fluid used with it easily decomposes posing a serious problem. Low effects are shown by alkali-metal carbonates, aluminates, humic acid salts, lignosulfonic acid salts, HEC, PVA, and phosphonic acids.

To solve the above-described problems for said additives hitherto used, there has been proposed the use of polyacrylic acids (salts) as drilling fluid additives in Japanese Official Patent Provisional Publications; showa 55-104383, 58-84883, 58-208376, 58-208377, 59-135280, 60-133085, and 62-199682.

However, since the polyacrylic acids or salts are not satisfactory in salt-resisting properties, in cases where water abundant in water hardness component or sea water is used as an aqueous medium to prepare drilling fluid, or in cases where plenty of underground water or sea water flows into drilling fluid in the underground working parts, the viscosity of the drilling fluid suffers damage and evacuation sometimes becomes difficult because of resulting gelation.

There has been proposed a method to remove the problems associated with the use of polyacrylic acids or salts. For example, Japanese Official Patent Provisional Publications, showa 58-120683, 58-219289, 60-181187, 61-120881, and 62-267388, have proposed drilling fluid additives composed of polyacrylic acids or salts in joint use with other components. While these additives have been somewhat, but insufficiently, improved in salt-proof properties, their use in relatively large amount is still needed. As such, it is hard to say whether this substantial fault in polyacrylic acids or salts has been removed. There has also been proposed, in Japanese Official Patent Provisional Publications, showa 58-104981, 61-241382, and 62-215681, the use of copolymers containing a sulfonic group. While copolymers containing a sulfonic group, when compared with polyacrylic acids or salts, have advantages such as improved salt-resisting properties, problems still exist. In this regard, although copolymers containing a sulfonic group described in Japanese Official Patent Provisional Publication, showa 58-104981, have been formed among an $\alpha$, $\beta$-ethylenic unsaturated carboxylic acid monomer, a monomer having a sulfonic group (vinylsulfonic acid, (meth)allylsulfonic acid, styrenesulfonic acid, 2-acrylamido-2-methylpropanesulfonic acid, and sulfoethyl methacrylate) and a (meth)acryl acid ester monomer or an unsaturated nitrile monomer, all of these still have the problem that if the mixing percentage of sea water exceeds 50%, the effect much lowers. Although the copolymers containing a sulfonic acid described in Japanese Official Patent Provisional Publication, showa 61-241382, have been formed between a (meth)acrylic acid monomer and a sulfoalkyl (meth) acrylate monomer, all of these have a high polymerization degree, so that the viscosity of the drilling fluid becomes high. Although the copolymers containing a sulfonic group described in Japanese Official Patent Provisional Publication, showa 62-215681, have been formed among (meth)acrylamide, a defined anionic vinyl monomer such as (meth)acrylic acid salts, 2-acrylamido-2-methylpropanesulfonic acid salts, and a defined water-soluble amphoteric vinyl monomer having a sulfonic group such as N-(2-sulfoethyl)-N-acrylamidoethyl-N,N-dimethylammonium amphoteric monomer and N-(3-sulfopropyl)-N-methacrylamidopropyl-N,N-dimethylammonium amphoteric monomer, all of these cause lowering of the effect if mixing percentage of sea water exceeds 60%.

OBJECT OF THE INVENTION

The present inventors undertook to solve the faults of hitherto known copolymers containing sulfonic acid group, while retaining the above-described advantages in the copolymers containing a sulfonic group.

This invention solves said problems involved in hitherto known drilling fluid additives which are added to stabilize drilling fluid used in cases where the ground is deeply excavated, such as a foundation work in engineering works or the boring of a petroleum well or geothermal well and so on.

Thus, the object of this invention is to provide drilling fluid additives composed of copolymers which are obtainable by an industrially favorable process and which are superior in heat-resisting property. Furthermore, even though the additives are used in a relatively small amount, such an amount is sufficient to prevent change in the properties of drilling fluid due to various kinds of hard water components being contained in underground water or cement as well as due to sea water, and the additives are able to display the properties of drilling fluid constantly, regardless of presence or absence of salts.

SUMMARY OF THE INVENTION

The present invention relates to drilling fluid additives composed of a water-soluble copolymer (A) having an average molecular weight of 1,000~50,000, which contain monomer components composed of a monomer (I) of 40~99.5 molar percentages in a series of unsaturated carboxylic acids, as shown in the following general formula (I), and an unsaturated monomer (II) of 0.5~60 molar percentages in a series of (meth)allylethers, as shown in the general formula (II).

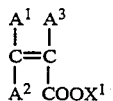

In the formula (I), each of $A^1$ and $A^2$ independently represents hydrogen, methyl, or $-COOX^2$, and $A^1$ and $A^2$ are not $-COOX^2$ at the same time. $A^3$ represents hydrogen, methyl, or $-CH_2COOX^3$ and, in a case that $A^3$ is $-CH_2COOX^3$, each of $A^1$ and $A^2$ independently represents hydrogen or methyl. Even of $X^1$, $X^2$, and $X^3$ independently or at the same time represents hydrogen, monovalent metal, divalent metal, ammonium, or organic amine.

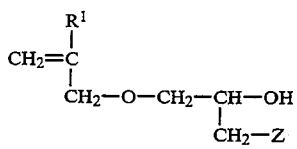

In the formula (II), $R^1$ represents hydrogen or methyl, and Z represents hydroxyl; a sulfonic acid group or its monovalent metal salt, divalent metal salt, ammonium salt, and organic amine salt; a phosphoric (or phosphorous) acid group or its monovalent metal salt, divalent metal salt, ammonium salt, and organic amine salt.

As the monomers (I) in a series of unsaturated carboxylic acids in this invention shown in said general formula (I) are cited, for examples, acrylic acid, methacrylic acid, crotonic acid, maleic acid, fumaric acid, itaconic acid, citraconic acid, and partially or totally neutralized products of those acids with monovalent metal, divalent metal, ammonia, or organic amine. Here, sodium and potassium etc. are cited as monovalent metals. Calcium, magnesium, and zinc etc. are cited as divalent metals. As organic amines are cited alkylamines such as monomethylamine, dimethylamine, trimethylamine, monoethylamine, diethylamine, and triethylamine; alkanolamines such as monoethanolamine, diethanolamine, triethanolamine, isopropanolamine, and dimethylethanolamine; and hetereoaromatic amines such as pyridine. Among those amines, (meth)acrylic acid and maleic acid or those products partially or totally neutralized with monovalent metals are preferred.

As the unsaturated monomers (II) as shown as said general formula (II), are cited, for example, glycerol monoallyl ether, glycerol monomethallyl ether, 3-allyloxy-2-hydroxypropanesulfonic acid, 3-methallyloxy-2-hydroxypropanesulfonic acid, 3-allyloxy-2-hydroxypropanephosphoric acid, 3-methallyloxy-2-hydroxypropanephosphoric acid, 3-allyloxy-2-hydroxypropanephosphorous acid, and 3-methallyloxy-2-hydroxypropanephosphorus acid or those products partially or totally neutralized with monovalent metals, divalent metals, ammonia, and organic amines. As monovalent metals are cited sodium and potassium, etc., as divalent metals are cited calcium and magnesium, and zinc etc. As organic amines are cited alkylamines such as monomethylamine, dimethylamine, trimethylamine, monoethylamine, diethylamine, and trimethylamine; alkanolamines such as monoethanolamine, diethanolamine, triethanolamine, isopropanolamine, and dimethylethanolamine, and heteroaromatic amines such as pyridine. Particularly, because of economically cheap cost and industrially easy availability, at least one compound among glycerol monoallyl ether, 3-allyloxy-2-hydroxypropanesulfonic acid, and those products partially or totally neutralized with monovalent metals are very preferred.

The water-soluble copolymer (A) used in the present invention is derived from a monomer component composed of 40~99.5 molar percentages of said unsaturated carboxylic acid monomer (I) and 0.5~60 molar percentages of said unsaturated monomer (II), where both percentages are against 100 molar percentages of a total amount of the monomers (I) and (II), in a series of (meth)allyl ethers and its average molecular weight needs to be in a range of 1,000~50,000. If either one of the composition of the monomer component or the average molecular weight is deviated from the above-defined range, a water-soluble copolymer (A) cannot be obtained which is able to display superior properties as a drilling fluid additive. That is, if the composition of the monomer component and/or the average molecular weight of the water-soluble copolymer (A) is deviated from the above-described range, for example, when said copolymer (A) is added in small amount, the fluid preparation with underground water or sea water becomes difficult and, during excavation, unfavorable property change of the drilling fluid due to an inflow of underground water, cement, and sea water cannot be prevented. Problems in heat-resistant properties may also occur.

To obtain the water-soluble copolymer (A) used in the present invention, a monomer component composed of the monomer in a series of unsaturated carboxylic acids (I) and the unsaturated monomer in a series of (meth)allyl ethers (II) are polymerized in a conventional manner. For example, in a case of water solution polymerization, the polymerization reaction is carried out according to a usual method using as a polymerization catalyzer, for example, persulfates such as sodium persulfate and potassium persulfate etc.; hydrogen peroxide; and water-soluble azo compounds such as 2,2'-azobis-(2-amidinopropane) hydrochloride, and 4,4'-azobis-4-cyanovaleric acid etc. Furthermore, when polymerization is carried out in organic solvents of an alcohol series such as methanol and isopropanol etc.; an ether series such as tetrahydrofuran and dioxane etc.; an aromatics series such as benzene, toluene, and xylene etc.; or a ketone series such as methylethyl ketone and methylisobutyl ketone etc., the polymerization reaction is carried out according to usual procedure using polymerization catalyzers, for example, organic peroxides such as benzoyl peroxide, lauroyl peroxide, and peracetic acid etc.; oil-soluble azo compounds such as azobisisobutyronitrile and 2,2'-azobis-(4-methoxy-2,4-dimethylvaleronitrile) etc.

Also, when a water-soluble copolymer (A) is wanted, it is possible to copolymerize, in a range of which an effect on this invention is not disturbed, any other monomer (III) which is copolymerizable with a monomer in a series of unsaturated carboxylic acids (I) and/or an unsaturated monomer in a series of (meth)allyl ether. As the other copolymerizable monomer (III), for example, are cited unsaturated monomers in an amide series such as (meth)acrylamide and N-t-butyl (meth)acrylamide etc.; hydrophobic unsaturated monomers such as (meth-)acrylates, styrene, 2-methylstyrene, and vinyl acetate etc.; unsaturated monomers in a sulfonic acid series such as vinyl sulfonic acid, allylsulfonic acid, methallylsulfonic acid, styrenesulfonic acid, 2-acrylamido-2-methylpropanesulfonic acid, sulfoethyl (meth)acrylate, sulfopropyl (meth)acrylate, 2-hydroxysulfopropyl (meth)acrylate, and sulfoethylmaleimide or their products partially or totally neutralized with monovalent metals, divalent metals, ammonia, and organic amines, but the monomer (II) is excepted; unsaturated monomers containing hydroxy group such as 2-hydroxyethyl (meth)acrylate, polyethyleneglycol mono(meth)acrylate, polypropyleneglycol mono(meth)acrylate, allyl alcohol, polyethyleneglycol monoallyl ether, polypropyleneglycol monoallyl ether, 3-methyl-3-butene-1-ol(isoprenol), polyethyleneglycol monoisoprenol ether, polypropyleneglycol monoisoprenol ether, 3-methyl-2-buten-1-ol(prenol), polyethyleneglycol monoprenol ether, polypropyleneglycol monoprenol ether, 2-methyl-3-buten-2-ol(isoprenealcohol), polyethyleneglycol monoisoprenealcohol ether, polypropyleneglycol monoisoprenealcohol ether, α-hydroxyacrylic acid, N-methylol (meth)acrylamide, glycerol mono(meth)acrylate, vinylalcohol etc.; cationic unsaturated monomers such as dimethylaminoethyl (meth)acrylate, and dimethylaminopropyl (meth)acrylamide etc.; unsaturated monomers in a nitrile series such as (meth)acrylonitrile etc.; unsaturated monomers containing phosphorus (but the monomer (II) is excepted) such as (meth)acrylamidomethanephosphonic acid, methyl (meth)acrylamidomethanephosphonate, 2-(meth)acrylamido-2-methylpropanephosphonic acid etc.; monomers in an α-olefinic series such as ethylene, propylene, 1-butene, isobutylene, α-amylene, 2-methyl-1-butene, 3-methyl-1-butene (e-isoamylene), 1-hexene, and 1-heptene etc. In a case that these monomers (III) are used, it is preferred to use less than 30 moles % of the total monomers to fully display the feature in this invention.

The water-soluble copolymers (A) thus obtained are used as drilling fluid additives by themselves or in combination with auxiliary additives (B) such as condensed phosphates, alkalimetal carbonates, aluminates, humic acid salts, lignosulfonic acid salts, CMC, HEC, PVA, and phosphonic acids etc. If, among these auxiliary additives (B), aluminates and CMC are used in combination with the copolymer (A), there is an advantage that the heat-resisting properties further increase. In the combination use with auxiliary additives (B), it is preferred to adjust the auxiliary additives (B) in a ratio of 5~500 weight parts against 100 weight parts of water-soluble copolymer (A). If the ratio exceeds the upper limit, the heat-resisting properties may lower adversely.

Drilling fluids are prepared by using drilling fluid additives of this invention with an inorganic clayey substance and an aqueous medium. Although proportion for use of these three is not especially limited, for example, it is preferred to adjust the inorganic clayey substances in 1~10 weight parts and the drilling fluid additives in 0.1~2 weight parts against 100 weight parts of an aqueous medium. If deviated from these ranges the drilling fluid may become inferior in stability over a long period of time. The proportion for use of the present drilling fluid additives became small, compared with a necessary amount, such as 0.3~5 weight parts for previous additives.

As said inorganic clayey substances, are used bentonite, attapulgite, sericite, etc., among which bentonite is especially preferred because the drilling fluid additives of this invention displays a great effect with it.

Since the drilling fluid additives in this invention are composed of said water-soluble copolymers (A), drilling fluid prepared with the additives has superior salt-resisting properties and, regardless of presence or absence of salts, exhibits stable physical properties. Thus, for example, in a case of drilling fluid preparation, as an aqueous medium can be used not only deionized water but also water containing relatively high content of hard water component such as underground water and industrial water, and water containing high content of inorganic salts, compared to the deionized water, such as sea water, river water, mineral spring water, hot spring water and the like. Also, during excavation, even if underground water, cement, sea water, and so on come into contact or are mixed, the drilling fluids do not cause gelation or show no tendency to increase viscosity or show only slightly. Besides, because dehydration amount does not increase much, it results in formation of a superior mud wall. Also, the drilling fluid additives in this invention, compared with hitherto known drilling fluid additives composed of copolymers containing a sulfonic group, are superior in heat-resisting properties, so that they can be used for a long time at high temperature.

Furthermore, the additives display superior effects even when added in small amounts, and the water-soluble copolymers (A) used in the present invention may be obtained with an economically cheap cost, compared with the previous copolymers, so that the excavation cost can be greatly reduced, and the industrial value for use is very high. Why the drilling fluid additives in this invention, as described above, display superior effects even in small amount of addition and does not easily suffer bad effects due to underground water, cement, sea water, and so on is not yet clear, but may be deduced as follows. That is, it is considered that the hydroxy group in the unsaturated monomer (II) in the (meth)allyl ether series reveals a significant additional effect with the anionic group in the monomer (I) in the unsaturated carboxylic acid series and, thus, contributes salt-resisting properties. However, due to this reason alone, the present invention is not entirely limited.

DETAILED DESCRIPTION OF THE INVENTION

Hereinafter, the present invention is illustrated with examples referring to examples for preparation of water-soluble copolymers, but the invention is not limited within these examples. Unless otherwise explained the word "part" represents "weight part" and "%" represents "weight %".

Preparation example 1 of water-soluble copolymers

Into a 1 liter volume glass-made round bottom flask equipped with thermometer and a reflux condenser was placed 175 parts of deionized water and warmed up to 95° C. With stirring, each of 371.9 parts of a 37% aqueous sodium acrylate solution, 18.7 parts of a 80% aqueous acrylic acid solution, 363.9 parts of a 25% aqueous sodium 3-allyloxy-2-hydroxypropanesulfonate solution, 43.1 parts of a 15% aqueous sodium persulfate solution, and 41.7 parts of a 5% aqueous hydrogen peroxide solution were separately and dropwise added through a dropping nozzle during 2 hours. Temperature was controlled at 95° C. during polymerization. After the dropping finished, the reaction mixture was maintained at the temperature for 30 minutes to complete polymerization and cooled. Then, the mixture was completely neutralized adjusting at pH 10 by using a 48% aqueous sodium hydroxide solution.

The obtained water-soluble copolymer (A), sodium salt of a copolymer between acrylic acid and 3-allyloxy-2-hydroxypropanesulfonic acid in a molar ratio of 80 to 20 (water-soluble copolymer (1)) showed 4,000 for average molecular weight as listed in Table 1.

Preparation examples 2∼18 of water-soluble copolymers and preparation reference examples 1∼18 of water-soluble polymers for comparison According to monomer compositions as shown in Tables 1 and 2 and the method in preparation example 1 of water-soluble copolymers, were obtained water-soluble copolymers (2)∼(18) and water-soluble polymers for comparison (1)∼(18).

Preparation example 19

The water-soluble copolymer was treated with electrodialysis to transform it into an acid form and then, completely neutralized to pH 10 by using an aqueous potassium hydroxide solution yielding a water-soluble copolymer (19). Average molecular weight of this polymer is shown in Table 1.

For these polymers, kinds, average molecular weights, and amounts of residual monomers are shown in Table 1 and Table 2.

EXAMPLE 1

In a tunk being made from stainless steel of austenite series (SUS304 by JIS) and having 90 mm φ of an inner diameter and 160 mm of height were placed 100 parts of deionized water, 6 parts of bentonite, and 0.2 parts of the water-soluble copolymer (1) which is the water-soluble copolymer (A) obtained as a drilling fluid additive from preparation example 1 of water-soluble copolymers, and the mixture was stirred for 15 minutes at 2000 rpm using dissolver blades (blade diameter, 40 mmφ) to obtain a drilling fluid composition (1).

For the obtained drilling fluid composition (1), Funnel viscosity (FV), gel strength after 10 minutes (10 Gel), and dehydration amount were determined and the results were listed as fundamental properties in Table 3. Funnel viscosity was measured with a 500 cc Funnel viscosimeter (unit, second). The gel strength after 10 minutes was measured with a fan VG meter (unit, pascal). The dehydration amount was determined by a filtrate amount which is obtained after treatment for 30 minutes at pressure of 3 kg per square cm by using a API standard filter (unit, ml).

For said drilling fluid composition (1), the cement-resisting examination, sea water-resisting examination, and heat-resisting examination below-described were carried out. As the results obtained from all these examinations show so small change from the fundamental properties, the drilling fluid composition shows excellent salt-resisting and heat-resisting properties and is superior as drilling fluid.

Examination for cement-resisting properties 106.2 parts of said drilling fluid composition (1) was mixed with 5 parts of cement and stood for 1 day, for which Funnel viscosity (FV), gel strength after 10 minutes (10 Gel), and dehydration amount were measured and results shown in Table 3.

Examination for sea water-resisting properties 106.2 parts of said drilling fluid composition (1) was mixed with 4 parts of Aquamarine S (a product of Yashima Pharmaceutical Co. made by 25 times concentration of artificial sea water) and the mixture was stood for 1 day and then, it was measured for Funnel viscosity (FV), gel strength after 10 minutes (10 Gel), and dehydration amount. Results are shown in Table 3.

Examination for heat-resisting properties 106.2 parts of said drilling fluid composition (1) was mixed with 2 parts of Aquamarine S (a product of Yashima Pharmaceutical Co. made by 25 times concentration of artificial sea water) and the mixture was subjected to curing for 20 hours at 260° C. and then, it was measured for Funnel viscosity (FV), gel strength after 10 minutes (10 Gel), and dehydration amount. Results are shown in Table 3.

EXAMPLES 2∼18

Except that the water-soluble copolymers (2)∼(18), which are water-soluble copolymers (A) obtained from preparation examples 2∼18 of water-soluble copolymers, were used as drilling fluid additives, a drilling fluid composition was obtained in the same way as for example 1 and its fundamental properties, cement-resisting properties, sea water-resisting properties, and heat-resisting properties were evaluated. Results are shown in Table 3.

EXAMPLE 19∼21

Except that carboxymethylcellulose was together with the water-soluble copolymer (A) used as a drilling fluid additive in the amount indicated in Table 3, the same procedure as used for example 1 was carried out to obtain a drilling fluid composition, of which fundamental properties, cement-resisting properties, sea water-resisting properties, and heat-resisting properties were evaluated. Results are shown in Table 3.

EXAMPLE 22∼24

Except that sodium aluminate (NaAlO$_2$) was used in the amount indicated in Table 3 instead of 0.1 part of carboxymethylcellulose, the same procedure as used for example 19 was carried out to obtain a drilling fluid composition, of which fundamental properties, cement-resisting properties, sea water-resisting properties, and heat-resisting properties were evaluated. Results are shown in Table 3.

EXAMPLE 25

Except that 0.1 part of potassium aluminate was jointly used as a drilling fluid additive, the procedure same as used for example 2 gave a drilling fluid composition, of which fundamental, cement-resisting, sea water-resisting, and heat-resisting properties were evaluated. Results are shown in Table 3.

EXAMPLE 26

Except that 0.1 part of carboxymethylcellulose was jointly used as a drilling fluid additive, the procedure same as used for example 4 gave a drilling fluid composition, of which fundamental, cement-resisting, sea water-resisting, and heat-resisting properties were evaluated. Results are shown in Table 3.

EXAMPLE 27

Except that the water-soluble copolymer (19) was used as a drilling fluid additive, the procedure same as used for example 1 gave a drilling fluid composition, of which fundamental, cement-resisting, sea water-resisting, and heat-resisting properties were evaluated. Results are shown in Table 3.

Comparison Examples 1~17

Except that water-soluble polymers for comparison (1)~(17) obtained from reference examples 1~17 were used as drilling fluid additives, the same procedure as used for example 1 was carried out to obtain a drilling fluid composition, of which fundamental properties, cement-resisting properties, sea water-resisting properties, and heat-resisting properties were evaluated. Results are shown in Table 4.

Comparison Example 18

Except that as a drilling fluid additive 0.2 parts of sodium aluminate was used in combination with the water-soluble polymer for comparison (7), the same procedure as used for comparison example 7 was carried out to obtain a drilling fluid composition, of which fundamental properties, cement-resisting properties, sea water-resisting properties, and heat-resisting properties were evaluated. Results are shown in Table 4.

Comparison Example 19

Except that carboxymethylcellulose was only used as a drilling fluid additive, the same procedure as used for example 1 was carried out to obtain a drilling fluid composition, of which fundamental properties, cement-resisting properties, sea water-resisting properties, and heat-resisting properties were evaluated. Results are shown in Table 4.

Comparison Example 20

Except that none of drilling fluid additive was used, the same procedure as used for example 1 was carried out to obtain a drilling fluid composition, of which fundamental, cement-resisting, sea water-resisting, and heat-resisting properties were evaluated. Results are shown in Table 4.

Comparison Example 21

Except that 0.2 parts of sodium aluminate and the water-soluble polymer for comparison (17) were jointly used as a drilling fluid additive, the procedure same as used for comparison example 17 was carried out to obtain a drilling fluid composition, of which fundamental, cement-resisting, sea water-resisting, and heat-resisting properties were evaluated. Results are shown in Table 4.

Comparison Example 22

Except that 0.2 parts of carboxymethylcellulose and the water-soluble polymer for comparison (17) were jointly used as a drilling fluid additive, the procedure same as used for comparison example 17 was carried out to obtain a drilling fluid composition, of which fundamental, cement-resisting, sea water-resisting, and heat-resisting properties were evaluated. Results are shown in Table 4.

Comparison Example 23

Except that the water-soluble polymer for comparison (18) obtained from reference example 18 was used as a drilling fluid additive, the procedure same as used for example 1 gave a drilling fluid composition, of which fundamental, cement-resisting, sea water-resisting, and heat-resisting properties were evaluated. Results are shown in Table 4.

TABLE 1

| | | water-soluble copolymer (A) | | | | |
|---|---|---|---|---|---|---|
| | | monomer composition (mole ratio) | | kind (for salt, 100 % neutralization) | average molecular weight | residual monomer amount (%) (solid weight/ solid weight) |
| | | (I) | (II) | | | |
| water-soluble copolymer | (1) | AA 80 | AHPSA 20 | sodium salt | 4,000 | 2.3 |
| | (2) | MeA 98 | AHPSA 2 | potassium salt | 7,000 | 0.1 |
| | (3) | AA 70 | AHPSA 30 | sodium salt | 3,000 | 2.5 |
| | (4) | AA 80 | AHPSA 20 | potassium salt | 1,500 | 1.6 |
| | (5) | AA 80 | AHPSA 20 | sodium salt | 35,000 | 2.4 |
| | (6) | MaA 45 | AHPSA 55 | sodium salt | 3,000 | 3.2 |
| | (7) | MaA 90 | AHPSA 10 | sodium salt | 8,000 | 1.2 |
| | (8) | AA 70 MaA 10 | AHPSA 20 | sodium salt | 4,000 | 2.2 |
| | (9) | MeA 70 FA 10 | AHPSA 20 | sodium salt | 5,000 | 1.8 |
| | (10) | AA 80 | GAE 20 | sodium salt | 4,000 | 1.6 |
| | (11) | AA 95 | GAE 5 | sodium salt | 8,000 | 0.4 |
| | (12) | AA 65 | GAE 35 | acid type | 6,000 | 1.9 |
| | (13) | AA 90 | GAE 20 | sodium salt | 2,000 | 1.9 |
| | (14) | AA 80 | GAE 20 | sodium salt | 45,000 | 1.6 |
| | (15) | MaA 50 | GAE 50 | sodium salt | 3,000 | 2.6 |
| | (16) | MaA 95 | GAE 5 | sodium salt | 25,000 | 0.7 |
| | (17) | AA 70 IA 10 | GAE 20 | sodium salt | 40,000 | 1.7 |
| | (18) | AA 80 | AHPPA 20 | sodium salt | 5,000 | 2.2 |
| | (19) | AA 80 | AHPSA 20 | potassium salt | 4,200 | 2.3 |

(NOTE)
AA means acrylic acid, MeA means methacrylic acid, MaA means maleic acid, FA means fumaric acid, IA means itaconic acid, AHPSA means 3-allyloxy-2-hydroxypropanesulfonic acid, GAE means glycerol monoallyl ether, AHPPA means 3-allyloxy-2-hydroxypropanephosphorous acid.

TABLE 2

| | | water-soluble homopolymer or copolymer for comparison | | | | | residual monomer amount (%) - (solid weight/ solid weight) |
|---|---|---|---|---|---|---|---|
| | | monomer composition (mole ratio) | | | kind (for salt, 100 % neutralization) | average molecular weight | |
| | | (I) | (II) | others | | | |
| water-soluble polymer for comparison | (1) | MeA 100 | — | — | potassium salt | 7,000 | 0.5 |
| | (2) | AA 30 | AHPSA 70 | — | sodium salt | 3,000 | 8.3 |
| | (3) | AA 80 | AHPSA 20 | — | potassium salt | 800 | 1.6 |
| | (4) | AA 80 | AHPSA 20 | — | sodium salt | 60,000 | 3.4 |
| | (5) | MaA 35 | AHPSA 65 | — | sodium salt | 3,000 | 6.3 |
| | (6) | MaA 90 | AHPSA 10 | — | sodium salt | 700 | 1.2 |
| | (7) | AA 100 | — | — | sodium salt | 8,000 | 0.2 |
| | (8) | AA 35 | GAE 65 | — | acid type | 6,000 | 4.6 |
| | (9) | AA 80 | GAE 20 | — | sodium salt | 600 | 1.4 |
| | (10) | AA 80 | GAE 20 | — | sodium salt | 55,000 | 3.8 |
| | (11) | MaA 35 | GAE 65 | — | sodium salt | 3,000 | 6.3 |
| | (12) | MaA 95 | GAE 5 | — | sodium salt | 65,000 | 1.2 |
| | (13) | AA 80 | — | AMPSA 20 | sodium salt | 4,000 | 2.3 |
| | (14) | AA 80 | — | ASA 20 | sodium salt | 4,000 | 7.6 |
| | (15) | AA 80 | — | VSA 20 | sodium salt | 4,000 | 3.2 |
| | (16) | AA 80 | — | SSA 20 | sodium salt | 4,000 | 4.2 |
| | (17) | AA 70 | — | MAC 10 SSA 20 | sodium salt sodium salt | 5,000 | 4.6 |
| | (18) | AA 70 | — | AMD 20 SPP 10 | sodium salt | 5,000 | 2.1 |

(NOTE)
AA means acrylic acid, MeA means methacrylic acid, MaA mew maleic acid, GAE means glycerol monoallyl ether, AHPSA means 3-allyloxy-2-hydroxypropanesulfonic acid, AMPSA means 2-acrylamido-2-methylpropanesulfonic acid, ASA means allyisulfonic acid, VSA-kneans vinylsulfonic acid, SSA means styrenesulfonic acid, MAe means methyl acrylate, AMD weans acrylamide, SPP means SPP-Betaine (N-(3-sulfopropyl)-N-methacrylamido-propyl-N, N-dimethyammonium).

TABLE 3

| | kind and amount (part) of drilling fluid additive (to 100 parts of deionized water) | | salt-resisting property and heat-resisting property of drilling fluid composition | | | | | | | |
|---|---|---|---|---|---|---|---|---|---|---|
| | | | F V (second) | | | | 10 Gel (Pa) | | | |
| | water-soluble copolymer (A) | auxiliary additive (B) | fundamental property | cement-resisting property | sea-water resisting property | heat resisting property | fundamental property | cement-resisting property | sea-water resisting property | heat-resisting property |
| example 1 | (1) ... 0.2 | — | 30.3 | 30.8 | 31.2 | 36.3 | 0.63 | 0.63 | 0.69 | 1.6 |
| example 2 | (2) ... 0.2 | — | 30.6 | 32.5 | 34.4 | 38.2 | 0.59 | 0.65 | 0.72 | 2.9 |
| example 3 | (3) ... 0.2 | — | 30.4 | 30.8 | 31.6 | 35.2 | 0.64 | 0.67 | 0.70 | 1.8 |
| example 4 | (4) ... 0.2 | — | 30.5 | 32.3 | 34.9 | 37.6 | 0.60 | 0.66 | 0.73 | 2.8 |
| example 5 | (5) ... 0.2 | — | 31.0 | 32.5 | 34.5 | 38.4 | 0.65 | 0.71 | 0.75 | 3.0 |
| example 6 | (6) ... 0.2 | — | 29.5 | 31.4 | 33.9 | 38.1 | 0.58 | 0.65 | 0.68 | 2.9 |
| example 7 | (7) ... 0.2 | — | 30.3 | 30.7 | 31.4 | 35.6 | 0.62 | 0.62 | 0.68 | 1.7 |
| example 8 | (8) ... 0.2 | — | 30.7 | 31.2 | 31.7 | 34.9 | 0.63 | 0.65 | 0.68 | 1.4 |
| example 9 | (9) ... 0.2 | — | 30.4 | 30.8 | 31.6 | 35.1 | 0.65 | 0.67 | 0.69 | 1.6 |
| example 10 | (10) ... 0.2 | — | 30.0 | 30.6 | 31.3 | 35.9 | 0.62 | 0.64 | 0.68 | 1.6 |
| example 11 | (11) ... 0.2 | — | 30.8 | 32.6 | 34.4 | 37.3 | 0.63 | 0.69 | 0.73 | 3.1 |
| example 12 | (12) ... 0.2 | — | 29.8 | 30.6 | 31.2 | 36.2 | 0.64 | 0.66 | 0.70 | 1.6 |
| example 13 | (13) ... 0.2 | — | 30.3 | 32.1 | 34.7 | 37.1 | 0.60 | 0.66 | 0.76 | 3.0 |
| example 14 | (14) ... 0.2 | — | 30.3 | 32.1 | 34.8 | 37.0 | 0.61 | 0.69 | 0.72 | 2.7 |
| example 15 | (15) ... 0.2 | — | 30.8 | 32.6 | 34.1 | 37.4 | 0.63 | 0.69 | 0.73 | 2.9 |
| example 16 | (16) ... 0.2 | — | 30.7 | 32.7 | 34.5 | 37.9 | 0.64 | 0.71 | 0.76 | 3.1 |
| example 17 | (17) ... 0.2 | — | 31.0 | 31.5 | 32.2 | 35.5 | 0.66 | 0.66 | 0.70 | 1.7 |
| example 18 | (18) ... 0.2 | — | 30.4 | 30.8 | 31.6 | 36.2 | 0.62 | 0.64 | 0.68 | 1.8 |
| example 19 | (1) ... 0.2 | CMC 0.1 | 30.3 | 30.5 | 30.9 | 31.0 | 0.63 | 0.63 | 0.65 | 0.83 |
| example 20 | (1) ... 0.2 | CMC 0.02 | 30.4 | 30.4 | 30.6 | 33.3 | 0.63 | 0.63 | 0.64 | 1.2 |
| example 21 | (1) ... 0.2 | CMC 0.6 | 34.2 | 34.7 | 35.2 | 37.4 | 0.85 | 0.87 | 0.89 | 1.4 |
| example 22 | (1) ... 0.2 | NaAlO$_2$ 0.1 | 30.4 | 30.6 | 30.7 | 30.8 | 0.63 | 0.63 | 0.64 | 0.79 |
| example 23 | (1) ... 0.2 | NaAlO$_2$ 0.02 | 30.5 | 30.6 | 30.9 | 33.0 | 0.63 | 0.64 | 0.64 | 1.1 |
| example 24 | (1) ... 0.2 | NaAlO$_2$ 0.9 | 30.4 | 30.5 | 30.7 | 33.1 | 0.64 | 0.64 | 0.65 | 1.2 |
| example 25 | (2) ... 0.2 | KAlO$_2$ 0.1 | 30.5 | 30.9 | 31.2 | 32.2 | 0.65 | 0.66 | 0.69 | 0.93 |
| example 26 | (4) ... 0.2 | CMC 0.1 | 30.4 | 30.8 | 31.4 | 32.6 | 0.66 | 0.69 | 0.72 | 1.03 |
| example 27 | (19) ... 0.2 | — | 30.3 | 30.6 | 30.9 | 33.4 | 0.64 | 0.64 | 0.68 | 1.2 |

| | kind and amount (part) of drilling fluid additive (to 100 parts of deionized water) | | salt-resisting property and heat-resisting property of drilling fluid composition | | | |
|---|---|---|---|---|---|---|
| | | | dehydration amount (ml) | | | |
| | water-soluble copolymer (A) | auxiliary additive (B) | fundamental property | cement-resisting property | sea water-resisting property | heat-resisting property |
| example 1 | (1) ... 0.2 | — | 8.4 | 8.5 | 8.6 | 10.6 |

TABLE 3-continued

| | | | | | | |
|---|---|---|---|---|---|---|
| example 2 | (2)...0.2 | — | 8.6 | 8.9 | 9.3 | 14.2 |
| example 3 | (3)...0.2 | — | 8.7 | 8.7 | 8.9 | 11.3 |
| example 4 | (4)...0.2 | — | 8.5 | 8.8 | 9.2 | 14.6 |
| example 5 | (5)...0.2 | — | 8.3 | 8.7 | 9.0 | 13.9 |
| example 6 | (6)...0.2 | — | 7.9 | 8.4 | 8.8 | 13.3 |
| example 7 | (7)...0.2 | — | 7.4 | 7.5 | 7.6 | 11.6 |
| example 8 | (8)...0.2 | — | 8.6 | 8.7 | 8.7 | 12.2 |
| example 9 | (9)...0.2 | — | 8.3 | 8.3 | 8.5 | 13.0 |
| example 10 | (10)...0.2 | — | 8.2 | 8.3 | 8.4 | 12.6 |
| example 11 | (11)...0.2 | — | 8.5 | 8.8 | 9.2 | 14.4 |
| example 12 | (12)...0.2 | — | 8.6 | 8.6 | 8.7 | 12.6 |
| example 13 | (13)...0.2 | — | 8.4 | 8.8 | 9.2 | 13.6 |
| example 14 | (14)...0.2 | — | 8.0 | 8.3 | 8.9 | 13.0 |
| example 15 | (15)...0.2 | — | 8.4 | 8.7 | 9.2 | 12.9 |
| example 16 | (16)...0.2 | — | 8.5 | 8.8 | 9.4 | 13.6 |
| example 17 | (17)...0.2 | — | 7.9 | 8.0 | 8.2 | 11.3 |
| example 18 | (18)...0.2 | — | 8.3 | 8.3 | 8.5 | 11.9 |
| example 19 | (1)...0.2 | CMC 0.1 | 8.4 | 8.5 | 8.5 | 9.3 |
| example 20 | (1)...0.2 | CMC 0.02 | 8.4 | 8.4 | 8.4 | 9.9 |
| example 21 | (1)...0.2 | CMC 0.6 | 8.5 | 8.4 | 8.5 | 9.8 |
| example 22 | (1)...0.2 | $NaAlO_2$ 0.1 | 8.4 | 8.5 | 8.5 | 8.5 |
| example 23 | (1)...0.2 | $NaAlO_2$ 0.02 | 8.4 | 8.4 | 8.4 | 9.8 |
| example 24 | (1)...0.2 | $NaAlO_2$ 0.9 | 8.5 | 8.4 | 8.4 | 9.7 |
| example 25 | (2)...0.2 | $KAlO_2$ 0.1 | 8.5 | 8.6 | 8.6 | 9.4 |
| example 26 | (4)...0.2 | CMC 0.1 | 8.5 | 8.7 | 8.9 | 9.7 |
| example 27 | (19)...0.2 | — | 8.3 | 8.3 | 8.4 | 10.0 |

TABLE 4

| | kind and amount (part) of drilling fluid additive (to 100 parts of deionized water) | | salt-resisting property and heat-resisting property of drilling fluid composition | | | | | | | |
|---|---|---|---|---|---|---|---|---|---|---|
| | | | F V (second) | | | | 10 Gel (Pa) | | | |
| | water-soluble copolymer for comparison | auxiliary additive (B) | fundamental property | cement-resisting property | sea-water resisting property | heat resisting property | fundamental property | cement-resisting property | sea-water resisting property | heat-resisting property |
| comparison example 1 | (1) 0.2 | — | 30.6 | 34.6 | 45.3 | 55.3 | 0.61 | 1.46 | 16.0 | 18.6 |
| comparison example 2 | (2) 0.2 | — | 30.3 | 34.9 | 39.5 | 59.6 | 0.58 | 1.16 | 5.3 | 7.4 |
| comparison example 3 | (3) 0.2 | — | 30.5 | 35.2 | 38.6 | 53.9 | 0.63 | 1.22 | 4.6 | 8.3 |
| comparison example 4 | (4) 0.2 | — | 39.8 | 34.3 | 41.2 | 56.5 | 0.66 | 1.29 | 5.5 | 7.9 |
| comparison example 5 | (5) 0.2 | — | 30.6 | 35.2 | 40.3 | 63.3 | 0.64 | 1.05 | 4.8 | 6.5 |
| comparison example 6 | (6) 0.2 | — | 31.0 | 35.5 | 40.6 | 61.6 | 0.61 | 1.11 | 6.3 | 8.9 |
| comparison example 7 | (7) 0.2 | — | 30.4 | 34.6 | 45.6 | 57.6 | 0.60 | 1.53 | 17.3 | 19.6 |
| comparison example 8 | (8) 0.2 | — | 30.5 | 35.0 | 40.9 | 58.8 | 0.62 | 1.16 | 5.5 | 8.2 |
| comparison example 9 | (9) 0.2 | — | 30.9 | 35.3 | 41.3 | 56.7 | 0.64 | 1.23 | 5.9 | 8.9 |
| comparison example 10 | (10) 0.2 | — | 31.1 | 34.9 | 40.6 | 59.4 | 0.65 | 1.15 | 6.3 | 9.4 |
| comparison example 11 | (11) 0.2 | — | 30.1 | 34.6 | 39.8 | 57.7 | 0.61 | 1.20 | 6.5 | 7.8 |
| comparison example 12 | (12) 0.2 | — | 29.8 | 34.5 | 40.6 | 59.9 | 0.63 | 1.08 | 7.3 | 8.8 |
| comparison example 13 | (13) 0.2 | — | 30.4 | 31.5 | 45.5 | 60.0 | 0.63 | 1.11 | 12.6 | 14.2 |
| comparison example 14 | (14) 0.2 | — | 30.6 | 31.6 | 46.2 | 62.1 | 0.62 | 1.08 | 11.6 | 13.9 |
| comparison example 15 | (15) 0.2 | — | 30.8 | 30.9 | 47.2 | 58.4 | 0.64 | 0.96 | 12.8 | 14.6 |
| comparison example 16 | (16) 0.2 | — | 31.5 | 32.2 | 44.9 | 59.6 | 0.65 | 1.21 | 14.6 | 16.3 |
| comparison example 17 | (17) 0.2 | — | 30.7 | 31.6 | 46.2 | 58.7 | 0.66 | 1.03 | 14.6 | 15.9 |
| comparison example 18 | (7) 0.2 | $NaAlO_2$ 0.2 | 30.0 | 33.8 | 36.8 | 51.2 | 0.63 | 1.03 | 3.4 | 6.2 |
| comparison example 19 | — | CMC 0.2 | 30.7 | 35.7 | 46.3 | 71.3 | 0.83 | 1.93 | 17.4 | 24.4 |
| comparison example 20 | — | — | 33.2 | gelation | 55.3 | gelation | 1.26 | gelation | 28.6 | geltation |
| comparison example 21 | (17) 0.2 | $NaAlO_2$ 0.2 | 30.7 | 31.4 | 34.4 | 49.3 | 0.64 | 1.03 | 3.6 | 5.9 |

TABLE 4-continued

| | water-soluble copolymer for comparison | auxiliary additive (B) | | | | | | | | |
|---|---|---|---|---|---|---|---|---|---|---|
| comparison example 22 | (17) 0.2 | CMC 0.2 | 30.9 | 31.9 | 33.9 | 48.8 | 0.65 | 0.98 | 3.1 | 6.4 |
| comparison example 23 | (18) 0.2 | — | 30.6 | 31.4 | 45.9 | 61.9 | 0.64 | 1.04 | 11.8 | 14.0 |

| | kind and amount (part) of drilling fluid additive (to 100 parts of deionized water) | | salt-resisting property and heat-resisting property of drilling fluid composition dehydration amount (ml) | | | |
|---|---|---|---|---|---|---|
| | water-soluble copolymer for comparison | auxiliary additive (B) | fundamental property | cement-resisting property | sea water-resisting property | heat-resisting property |
| comparison example 1 | (1) 0.2 | — | 11.3 | 16.6 | 26.4 | 30.3 |
| comparison example 2 | (2) 0.2 | — | 12.2 | 14.1 | 15.6 | 19.8 |
| comparison example 3 | (3) 0.2 | — | 13.3 | 15.2 | 16.2 | 20.7 |
| comparison example 4 | (4) 0.2 | — | 12.6 | 14.9 | 15.8 | 21.3 |
| comparison example 5 | (5) 0.2 | — | 12.5 | 14.6 | 15.4 | 18.6 |
| comparison example 6 | (6) 0.2 | — | 11.9 | 14.1 | 15.8 | 21.1 |
| comparison example 7 | (7) 0.2 | — | 12.6 | 17.3 | 27.3 | 29.6 |
| comparison example 8 | (8) 0.2 | — | 12.2 | 14.5 | 16.2 | 19.8 |
| comparison example 9 | (9) 0.2 | — | 12.5 | 14.6 | 15.4 | 22.5 |
| comparison example 10 | (10) 0.2 | — | 12.7 | 14.8 | 15.3 | 23.4 |
| comparison example 11 | (11) 0.2 | — | 11.9 | 13.7 | 15.9 | 19.0 |
| comparison example 12 | (12) 0.2 | — | 12.4 | 14.1 | 16.8 | 22.6 |
| comparison example 13 | (13) 0.2 | — | 12.4 | 13.3 | 26.3 | 28.2 |
| comparison example 14 | (14) 0.2 | — | 12.3 | 12.9 | 26.9 | 28.6 |
| comparison example 15 | (15) 0.2 | — | 12.6 | 13.6 | 27.3 | 30.1 |
| comparison example 16 | (16) 0.2 | — | 12.4 | 13.0 | 27.8 | 29.9 |
| comparison example 17 | (17) 0.2 | — | 12.7 | 14.5 | 26.9 | 31.3 |
| comparison example 18 | (7) 0.2 | NaAlO$_2$ 0.2 | 11.3 | 14.6 | 16.4 | 23.6 |
| comparison example 19 | — | CMC 0.2 | 12.8 | 19.4 | 30.4 | 43.3 |
| comparison example 20 | — | — | 14.6 | gelation | 45.3 | gelation |
| comparison example 21 | (17) 0.2 | NaAlO$_2$ 0.2 | 12.1 | 13.8 | 16.5 | 21.1 |
| comparison example 22 | (17) 0.2 | CMC 0.2 | 12.4 | 14.0 | 15.9 | 22.4 |
| comparison example 23 | (18) 0.2 | — | 12.2 | 12.9 | 25.3 | 28.3 |

The water-soluble copolymers (A) in the present invention, as shown in Tables 1–4, in comparison with the drilling fluid additives hitherto used, are superior in cement-, sea water-, and salt-resisting properties even when used in small amounts, so that they are of high value for industrial use. Also, there is a secondary excellent feature which, because the residual monomer from the water-soluble copolymer (A) is only present in a small amount, environmental pollution need not be feared.

Furthermore, when the water-soluble copolymer (A) and carboxymethylcellulose and/or an aluminate are jointly used in a specially defined proportion, a more favorable drilling fluid additive can be obtained compared with a single use of a water-soluble copolymer (A).

What is claimed are:

1. A drilling fluid composition for mud wall formation which comprises 100 weight parts of an aqueous medium, 1–10 weight parts of an inorganic substance comprising bentonite, and 0.1–2 weight parts of a drilling fluid additive, wherein the drilling fluid additive is composed of a water-soluble copolymer (A) which has an average molecular weight of 1,000 to 50,000, said water-soluble copolymer (A) being obtained by polymerization of monomer components containing 40–99.5 mole % of an unsaturated carboxylic acid monomer of the formula I

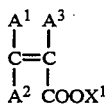

wherein $A^1$ and $A^2$ independently represents hydrogen, methyl or $-COOX^2$, with the proviso that $A^1$ and $A^2$ cannot both be $-COOX^2$; $A^3$ represents hydrogen, methyl or $-CH_2COOX^3$ and, in case where $A^3$ is $-CH_2COOX^3$, each $A^1$ and $A^2$ independently represents hydrogen or methyl; and $X^1$, $X^2$ and $X^3$ independently represents hydrogen, monovalent metal, divalent metal, ammonium or an organic amine, and 0.5–60 mole % of an unsaturated (meth)allyl ether monomer of the formula II

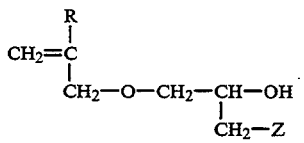

wherein R represents hydrogen or methyl and Z represents hydroxyl, a sulfonic acid group or its monovalent metal salt, divalent metal salt, ammonium salt or organic amine salt, a phosphoric or phosphorous acid group or its monovalent metal salt, divalent metal salt, ammonium salt or organic amine salt.

2. The drilling fluid composition of claim 1, wherein the monomer of the unsaturated carboxylic acid of the formula I are (meth)acrylic acid, maleic acid, salts thereof or mixture thereof.

3. The drilling fluid composition of claim 1, wherein the unsaturated monomer of the (meth)allyl ether is selected from the group consisting of glycerol monoallyl ether, 3-allyloxy-2-hydroxypropanesulfonic acid, salts thereof and mixtures thereof.

4. The drilling fluid composition of claim 1, further comprising at least one auxiliary additive selected from the group consisting of carboxymethylcellulose and aluminates.

5. The drilling fluid composition of claim 4 containing 1–10 weight parts of the inorganic comprising bentonite substance and 0.1–2 weight parts of the drilling fluid additive per 100 weight parts of the aqueous medium and 5–500 weight parts of the at least one auxiliary additive per 100 parts of the water-soluble copolymer (A).

* * * * *